Figure 1:
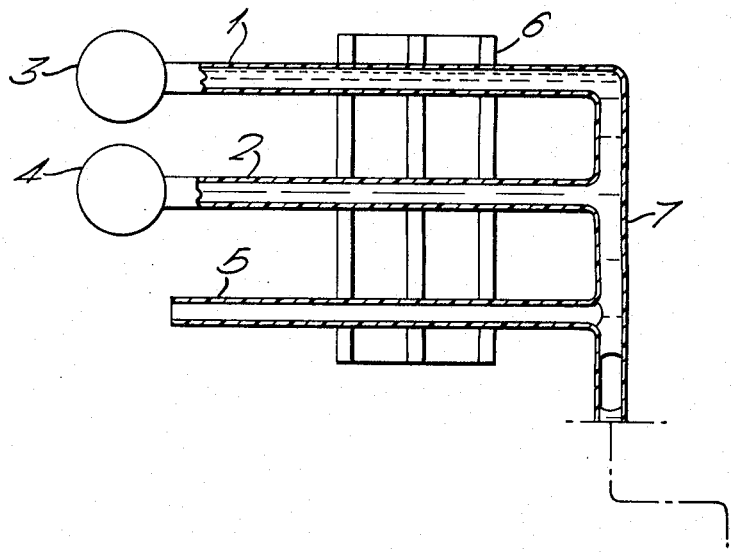

United States Patent [19]
Thomas

[11] 3,909,136
[45] Sept. 30, 1975

[54] METHOD AND APPARATUS FOR MEASURING THE OPTICAL CHARACTERISTICS OF A FLOWING LIQUID STREAM

[75] Inventor: Alan John Thomas, Richmond, England

[73] Assignee: The Rank Organisation Limited, London, England

[22] Filed: Aug. 9, 1973

[21] Appl. No.: 386,886

[30] Foreign Application Priority Data
Aug. 9, 1972 United Kingdom............. 37074/72

[52] U.S. Cl. ............... 356/181; 250/573; 356/205
[51] Int. Cl............................ G01j 3/46; G01j 21/26
[58] Field of Search ........... 356/181, 201, 205, 206; 250/573

[56] References Cited

UNITED STATES PATENTS

| 3,422,667 | 1/1969 | Hrdina............................. 356/181 |
| 3,484,170 | 12/1969 | Smythe et al. .................... 356/181 |
| 3,572,994 | 3/1971 | Hochstrasser..................... 356/181 |
| 3,784,310 | 1/1974 | Barton et al. ..................... 356/181 |

*Primary Examiner*—Vincent P. McGraw
*Attorney, Agent, or Firm*—Brisebois & Kruger

[57] ABSTRACT

A device for measuring the optical characteristics of a flowing liquid stream wherein the stream is formed into liquid segments separated by gaseous segments, a light beam is passed through the segmented stream and detected after passage through the liquid and gaseous segments by a photo-detecting means adapted to provide an output related to the optical characteristics of the liquid.

6 Claims, 4 Drawing Figures

METHOD AND APPARATUS FOR MEASURING THE OPTICAL CHARACTERISTICS OF A FLOWING LIQUID STREAM

The subject of this invention is a device for measuring the optical characteristics of a liquid and particularly of a mixture of liquids flowing in a stream.

Heretofore there have been difficulties associated with measuring the optical characteristics, for example the colour, of a liquid flowing in a stream because turbulence in the flowing liquid influenced the output of the measuring device and where a mixture was concerned variations could occur in the composition of the mixture while flow was taking place so that the resulting measurement was to some extent indefinite. To overcome these difficulties it has been proposed to break up the flowing stream into segments so that the liquid travels in a series of discrete elements. This substantially prevents back mixing during flow of the liquid because the elements are separated from one another while the liquid is moving to the point where the optical characteristics are measured, then just before this point is reached the liquid segments are joined together. The liquid is then caused to pass through a portion of tube through which a light beam is directed towards a photoelectric cell.

The previously proposed method is an improvement on what had been done earlier but still suffers from the disadvantage that the analytical speed i.e. the rate at which the samples constituted by the liquid segments can be presented to the measuring device must be kept low because if the speed should be increased turbulence tends to occur in the flowing liquid and while the liquid segments are being joined together. The size of the segments has to be kept relatively large to obtain a reasonable operating speed. The low rate of presenting the samples, i.e. the liquid segments, and the large size of the segments have the effect of providing a low sensitivity. As small samples take less time to pass the measuring device the speed of flow of small samples must be kept low. Increasing the speed of flow of the liquid thus requires that the samples should be large so that there is sufficient time for the measuring device to act on the portion of the sample between the ends where mixing is at a minimum. There are also other variables for which it is extremely difficult to make allowance, for example the absorption of the flow cell or tube through which the liquid is passing and the sensitivity of the device measuring the optical characteristics. With continuous measurement as in the known devices it is impossible to place an accurate value on these variables.

The improvement which it is desired to achieve is thus to take measurements of the optical characteristics of a flowing liquid free from possible descrepancies caused by mixing and turbulence and by unknown quantities associated with the flow cell and the detector, to use small samples so that high sensitivity is achieved and to operate with a relatively low flow rate even when the rate of sampling is high. It is an object of the present invention to provide a measuring device which provides these desirable characteristics.

A device for measuring the optical characteristics of a liquid in a flowing stream, comprising means to break up the flowing stream into a series of liquid segments separated by gaseous segments, light emitting means for projecting a beam of light through both the liquid and gaseous segments of the segmented stream transversely to the direction of flow thereof, and a photoelectric detecting means for receiving the light beam after passage thereof through the segmented stream and adapted to provide an output which is related to the optical characteristics of the liquid.

The device may include a comparator arranged to receive the output of the photoelectric detector and provide a reading the value of which is the difference between that obtained when the light beam is traversing the sample-containing liquid segment and that when the light beam is traversing a buffer segment.

The photoelectric detector may be arranged to provide an output which is a function of the amplitide of the light waves of the beam.

The light-emitting means may be arranged to project the beam of light perpendicularly of the line of flow of the stream or obliquely of the line of flow to increase the length of the portion of the beam in the liquid.

The photoelectric detector may be placed to receive the light beam as a direct beam or as a reflected beam. Where the beam is a reflected beam the device may include mirrors to reflect the beam several times through the same liquid segment.

The light-emitting means may be arranged to emit most or all of its light in a limited region of the visible or the infra-red or the ultra-violet portion of the spectrum.

Figure 2:
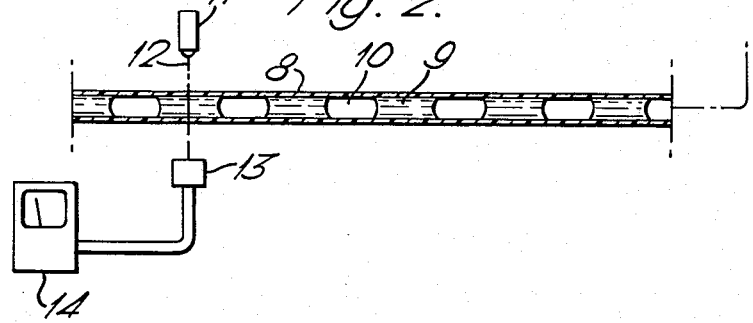
Figure 3:
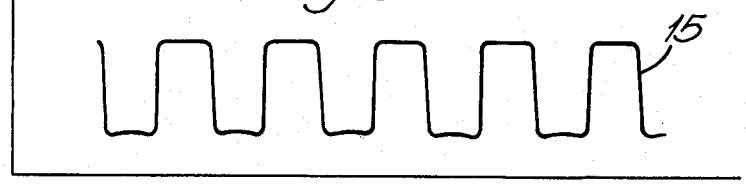
Figure 2A:
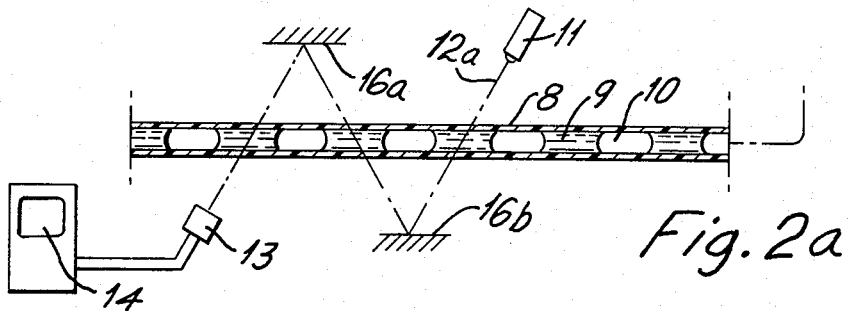

A practical embodiment of the invention is illustrated in the accompanying drawings in which, FIG. 1 illustrates a known device for breaking up a flowing stream into a series of liquid segments separated by buffer fluid segments, in this case air segmemts, FIG. 2 illustrates in diagrammatic form a device according to the invention, FIG. 2a illustrates certain modifications of the device of FIG. 2, and FIG. 3 illustrates the waveform of the output from the photoelectric detector.

In the drawings 1 and 2 denote collapsable tubes carrying liquid to be mixed, the liquid being obtained from receptacles 3 and 4 respectively, 5 denotes a collapsable tube open at the end for ingress of air, 6 denotes a set of orbiting rollers or oscillating fingers arranged to squeeze flat the tubes 1, 2 and 5 in an intermittent progressive movement from left to right as seen in FIG. 1 whereby to impel liquid in the tubes 1 and 2 and air in the tube 5 into the delivery tube 7. This arrangement constitutes a peristaltic pump of known type. 8 denotes a continuation of the delivery tube 7 constituting a portion of the device for detecting the optical characteristics of the liquid, 9 denotes liquid segments in the tubes 7 and 8, and 10 denotes air segments in the tubes 7 and 8 separating adjacent liquid segments 9. 11 denotes a light-emitting means arranged to project a beam 12 of light transversely of the stream of liquid constituted by the liquid segments 9 in the tube 8, 13 denotes a photoelectric detector located to receive the beam 12 and 14 denotes a device for interpreting the output of the photoelectric detector 13 in terms of the optical characteristics to be measured. The device 14 may be, or may incorporate a comparator. 15 denotes a typical wave form output from the photoelectric detector 13 showing how the output varies as liquid segments 9 and air segments 10 are traversed by the beam 12.

In practice, the peristaltic pump when set in operation pumps liquid from the receptacles 3 and 4 through the tubes 1 and 2 into the delivery tube 7 where the liquids start mixing. The pump also draws air in through the tube 5 and introduces the air in the form of a series of pulses into the tube 7. The pulses of air, in entering the tube intermittently, form air segments 10 separating adjacent liquid segments 9. The beam of light 12 traversing the stream of liquid suffers greater absorption when it traverses each segment 9 than it does when it traverses each air segment 10. The illustrated wave form shows how this happens. As exactly the same conditions apply when the beam 12 traverses the air segments 10 as apply when the beam traverses the liquid segments 9 except for the interposition of the liquid the output of the photoelectrical detector 13 while the beam is traversing each air segment 10 provides a basis for obtaining a true measurement of the optical characteristics of the liquid because the same external variables apply in both cases but when the beam is traversing the air segments only the variables are present so that if the output when the beam is traversing an air segment is subtracted from the output obtained when the beam is traversing a liquid segment the difference represents entirely the change caused by the interposition of the liquid. It is necessary to take account of effects due to differences in refractive index of the liquid and the air segments. In a normal cylindrical tube the air segment has the effect of a strong negative cylindrical lens and much light is lost by refraction. Because of the definite "chopping" action on the light beam at each interface between each liquid segment and the adjacent air segment the device is positive in action and the response is unaffected by the length of the liquid segments so that a high flow rate can be achieved without turbulence appearing in the liquid of the segments.

Various modifications of the above-described arrangements are possible within the scope of the invention as defined in the appended claims. For example, in order to increase the length of the path of the light beam through the segmented stream, the beam may be projected obliquely to the direction of flow. A similar effect may be achieved by the use of one or more reflectors for reflecting the beam two or more times through the stream before incidence on the detector. The use of the two modifications in combination is shown in FIG. 2a in which reference numeral 16 indicates the oblique beam and numerals 16a and 16b indicate the two reflectors.

It will be apparent that colorimetric apparatus in accordance with the present invention may be adapted to function in the flame photometry, nephelometric and fluorimetric modes.

I claim:

1. In a device for measuring the optical characteristics of a liquid in a flowing stream and having a light source for projecting a beam of light through the stream transversely to the direction of flow thereof and a photo-electric detector for receiving the beam of light after passage thereof through the stream, the improvement comprising:

means to break up the flowing stream into a succession of liquid segments separated by gaseous segments, a light-transmitting conduit for carrying the segmented stream through the path of the light beam, means whereby the detector is adpated to provide an output related to the optical characteristics of the liquid, and a comparator arranged to receive the output of the photo-electric detector and provide a reading the value of which is the difference between that obtained when the light beam is traversing a liquid segment and that when the light beam is traversing a gaseous segment.

2. A device according to claim 1, wherein the light source is adapted to project the light beam perpendicularly to the direction of flow of the segmented stream.

3. A device according to claim 1, wherein the light source is adapted to project the light beam obliquely to the direction of flow of the segmented stream.

4. A device according to claim 1, further comprising reflectors arranged in the path of the beam of light for reflecting the beam several times through the segmented stream and thence to the detector.

5. A device according to claim 1, wherein the detector is adapted to provide an output which is a function of the mean wavelength of the light waves of the beam.

6. A method of measuring the optical characteristics of a liquid in a flowing stream comprising the steps of:

breaking up the flowing stream into a series of liquid segments separated by gaseous segments, passing a beam of light through the segmented stream transversely to the direction of flow, detecting the light beam after passing thereof through the liquid and gasous segments of the stream, providing an output related to the optical characteristics of the liquid, and comparing the respective outputs of the detector due to passage of the light beam through the liquid segments and through the gaseous segments to provide a difference signal.

* * * * *